(12) United States Patent
Hongo et al.

(10) Patent No.: US 9,727,107 B2
(45) Date of Patent: Aug. 8, 2017

(54) SLAVE DEVICE REQUESTING ITS MASTER DEVICE NOT TO CANCEL ITS POWER SAVING MODE

(75) Inventors: Hiroo Hongo, Tokyo (JP); Masaki Yasukawa, Tokyo (JP)

(73) Assignees: NEC CORPORATION, Tokyo (JP); NEC Magnus Communications, Ltd., Tokyo (JP)

( * ) Notice: Subject to any disclaimer, the term of this patent is extended or adjusted under 35 U.S.C. 154(b) by 202 days.

(21) Appl. No.: 13/813,744

(22) PCT Filed: Aug. 4, 2011

(86) PCT No.: PCT/JP2011/067852
§ 371 (c)(1),
(2), (4) Date: Feb. 1, 2013

(87) PCT Pub. No.: WO2012/126299
PCT Pub. Date: Jan. 3, 2012

(65) Prior Publication Data
US 2013/0132744 A1     May 23, 2013

(30) Foreign Application Priority Data
Aug. 24, 2010   (JP) .................................. 2010-187141

(51) Int. Cl.
*G06F 1/32*     (2006.01)
*G06F 1/26*     (2006.01)
(Continued)

(52) U.S. Cl.
CPC ............ *G06F 1/266* (2013.01); *G06F 13/126* (2013.01); *G08C 17/00* (2013.01); *H04Q 9/00* (2013.01);
(Continued)

(58) Field of Classification Search
CPC ....... G06F 1/3203; G06F 1/3234; H04L 12/12
(Continued)

(56) References Cited

U.S. PATENT DOCUMENTS

| 8,448,001 B1 * | 5/2013 | Zhu et al. ..................... 713/322 |
| 2003/0182415 A1 * | 9/2003 | Vicard .......................... 709/223 |

(Continued)

FOREIGN PATENT DOCUMENTS

| JP | H7-42270 U | 7/1995 |
| JP | H8-251680 A | 9/1996 |

(Continued)

OTHER PUBLICATIONS

Communication dated May 12, 2015, issued by the Japanese Patent Office in counterpart Japanese application No. 2012-530606.

(Continued)

*Primary Examiner* — Thomas Lee
*Assistant Examiner* — Santosh R Poudel
(74) *Attorney, Agent, or Firm* — Sughrue Mion, PLLC

(57) ABSTRACT

A controlled apparatus periodically transmits state information indicating the state of the apparatus, and when the state has been changed, transmits state information indicating the state after the change. Upon receiving state information from the controlled apparatus, a control apparatus, when not requesting a change of state in the controlled apparatus, returns the state information to the controlled apparatus, and when requesting a change of the state in the controlled apparatus, changes state parameters in the state information that correspond to the state to be changed to required values and transmits the state information after the change to the controlled apparatus as a control command. The controlled apparatus, upon receiving the control command from the control apparatus, changes to a state in accordance with the state parameters that follow the change and transmits the (Continued)

state information indicating the state after the change to the control apparatus.

8 Claims, 15 Drawing Sheets

(51) Int. Cl.
*H04Q 9/00* (2006.01)
*G06F 13/12* (2006.01)
*G08C 17/00* (2006.01)
*H04L 12/12* (2006.01)

(52) U.S. Cl.
CPC .......... *G08C 2201/50* (2013.01); *H04L 12/12* (2013.01); *H04Q 2209/826* (2013.01); *H04Q 2209/883* (2013.01)

(58) Field of Classification Search
USPC .................................................. 713/323, 320
See application file for complete search history.

(56) References Cited

U.S. PATENT DOCUMENTS

| | | | |
|---|---|---|---|
| 2005/0086549 A1* | 4/2005 | Solomon et al. | 713/320 |
| 2005/0123109 A1* | 6/2005 | Yamagishi et al. | 379/102.01 |
| 2005/0240673 A1* | 10/2005 | Yoneda et al. | 709/229 |
| 2006/0072475 A1* | 4/2006 | Ida et al. | 370/252 |
| 2006/0077053 A1* | 4/2006 | Park et al. | 340/521 |
| 2006/0117196 A1* | 6/2006 | Sakemoto et al. | 713/320 |
| 2006/0193315 A1* | 8/2006 | Sinivaara et al. | 370/389 |
| 2007/0061041 A1* | 3/2007 | Zweig | 700/245 |
| 2007/0124608 A1* | 5/2007 | Knowlson et al. | 713/300 |
| 2007/0207765 A1* | 9/2007 | Nakahara et al. | 455/343.1 |
| 2007/0280300 A1* | 12/2007 | Hu | 370/503 |
| 2008/0005600 A1* | 1/2008 | Diab | G06F 1/3209 713/300 |
| 2008/0028242 A1* | 1/2008 | Cepulis | 713/320 |
| 2008/0162958 A1* | 7/2008 | Bozek et al. | 713/310 |
| 2008/0209244 A1* | 8/2008 | Miller et al. | 713/322 |
| 2008/0294920 A1* | 11/2008 | Hatasaki et al. | 713/323 |
| 2009/0092060 A1* | 4/2009 | Goto | H04L 63/0428 370/254 |
| 2009/0097428 A1* | 4/2009 | Kneckt et al. | 370/311 |
| 2009/0204667 A1* | 8/2009 | Diaz et al. | 709/203 |
| 2009/0271047 A1* | 10/2009 | Wakamatsu | 700/295 |
| 2010/0094470 A1* | 4/2010 | Besore | G06Q 50/06 700/282 |
| 2010/0115144 A1* | 5/2010 | Dubs et al. | 710/8 |
| 2010/0168897 A1* | 7/2010 | August et al. | 700/105 |
| 2011/0320015 A1* | 12/2011 | Yun et al. | 700/19 |
| 2012/0100828 A1* | 4/2012 | Leblanc et al. | 455/404.2 |

FOREIGN PATENT DOCUMENTS

| | | |
|---|---|---|
| JP | 2001-043038 A | 2/2001 |
| JP | 2004-302596 A | 10/2004 |
| JP | 2005-175625 A | 6/2005 |
| JP | 2005-217927 A | 8/2005 |
| JP | 2006-317993 A | 11/2006 |
| JP | 2008-131157 A | 6/2008 |
| JP | 2008-199120 A | 8/2008 |
| JP | 2009-147577 A | 7/2009 |
| JP | 2010-178089 A | 8/2010 |
| WO | 2010/107117 A1 | 8/2015 |

OTHER PUBLICATIONS

Communication dated Aug. 4, 2015 from the Japanese Patent Office in counterpart application No. 2012-530606.

* cited by examiner

P : Parameter  R/C : Request/Cancel
P/R : Control Permit/Refuse  F : Forcing

SLAVE DEVICE REQUESTING ITS MASTER DEVICE NOT TO CANCEL ITS POWER SAVING MODE

CROSS REFERENCE TO RELATED APPLICATIONS

This application is a National Stage of International Application No. PCT/JP2011/067852, filed on Aug. 4, 2011, which claims priority from Japanese Patent Application No. 2010-187141, filed Aug. 24, 2010, the contents of all of which are incorporated herein by reference in their entirety.

TECHNICAL FIELD

The present invention relates to a state control system and method for controlling the state of an apparatus.

BACKGROUND ART

With advances in information communication technology in recent years, a variety of apparatuses are being connected to and used in networks. However, there are apparatuses that are not necessarily installed in locations for which a power supply is readily available, such as various types of sensors for the detection of temperature and the quantity of light in factories or buildings or for detecting the opened or closed state of doors and windows as well as monitor cameras and wireless LAN (Local Area Network) access points. In addition, there are some kinds of devices, connecting which it was not necessary to consider a power supply (such as a fixed-line phone that is supplied with power from the telephone line), but which have come to require a power supply due to the additional functions for LAN, such as an IP phone.

Known methods of enabling the supply of power while enabling data communication with various types of such apparatuses include, for example, PoE (Power over Ethernet).

PoE is a technology that enables the transmission and reception of data and power supply by way of a predetermined cable but is not a technology for controlling the state (ON/OFF of the power supply, transition to sleep state, recovery from sleep state, regardless of whether the main functions of an apparatus are operating, etc.) of each apparatus. In order to enable the control of the state of each controlled apparatus, the state of each controlled apparatus must be communicated to the control device. Examples of technology that can be used in this communication of states include LLDP (Link Layer Discovery Protocol) and CAN (Controller Area Network).

In addition, although not standardized such as LLDP and CAN, a method that monitors the state changes of a plurality of printers to ease congestion of traffic on a network is disclosed in Patent Literature 1. In addition, the acquisition of the operating state of a residential apparatus to transmit control information and bring about operation when the residential apparatus can be remotely operated is disclosed in Patent Literature 2. Still further, Patent Literature 3 discloses a technology for enabling the remote control of an apparatus by way of a communication network even when turning OFF the power supply has caused the IP address to be assigned to another apparatus.

The above-described LLDP is a protocol for communicating information such as the type and setting information of a network apparatus or terminal to a neighboring apparatus, but even though a control apparatus is able to collect information of a controlled apparatus, it is not capable of controlling states that include turning ON and OFF the power source of a controlled apparatus.

Still further, the above-described CAN or the technology described in Patent Literatures 1-3 is basically technology for controlling the operation of a controlled apparatus when the power source of the controlled apparatuses is ON and does not control states that include turning ON and OFF the power source of the controlled apparatus. Still further, CAN requires the assignment of a characteristic identifier (ID) to a controlled apparatus through human operation, raising the problem of the extra time and trouble required for reassigning an ID when a particular controlled apparatus is moved and used in a different network that corresponds to CAN.

RELATED ART LITERATURE

Patent Literature

Patent Literature 1: Japanese Patent Laid-Open No. 2001-043038
Patent Literature 2: Japanese Patent Laid-Open No. 2004-302596
Patent Literature 3: Japanese Patent Laid-Open No. 2005-175625

SUMMARY

It is therefore an object of the present invention to provide a state control system and method that can easily realize communication of information between a control apparatus and a controlled apparatus as well as the state control of each controlled apparatus.

The state control system of an exemplary aspect of the present invention for achieving the above-described object includes:

a controlled apparatus that periodically transmits state information that indicates the current state of its own apparatus and that includes information for identifying its own apparatus and further, when the state has changed, that transmits state information that indicates the state following this change; and a control apparatus that, upon receiving the state information from the controlled apparatus when not requesting a change of state in the controlled apparatus, returns the state information to the controlled apparatus, and when requesting a change of state in the controlled apparatus, changes state parameters that are contained in the state information that was already received from the controlled apparatus and that correspond to state that is, to be changed to required values and transmits state information that contains the state parameters that follow the change as a control command to the controlled apparatus;

wherein the controlled apparatus, upon receiving the control command from the control apparatus, transitions to a state that corresponds to the values of the state parameters that were changed and transmits to the control apparatus state information that indicates the state that follows the change.

The state control method of an exemplary aspect of the present invention includes steps of:

a controlled apparatus periodically transmitting to a control apparatus state information that includes information for identifying its own apparatus and that indicates the current state of its own apparatus;

when the state has been changed, the controlled apparatus transmitting to the control apparatus state information that indicates the state after the change;

the control apparatus, upon receiving the state information from the controlled apparatus when not requesting a change of state in the controlled apparatus, returning the state information to the controlled apparatus; and the control apparatus, when requesting a change of state in the controlled apparatus, changing state parameters that are contained in the state information that has already been received from the controlled apparatus and that correspond to the state that is to be changed to required values and transmitting state information that includes the state parameters that follow the change to the controlled apparatus as a control command; and the controlled apparatus, upon receiving the control command from the control apparatus, transitioning to a state that corresponds to the values of the state parameters that were changed and transmitting to the control apparatus state information that indicates the state following the change.

EXEMPLARY EMBODIMENT

The present invention is next described with reference to the accompanying drawings.

Figure 1:
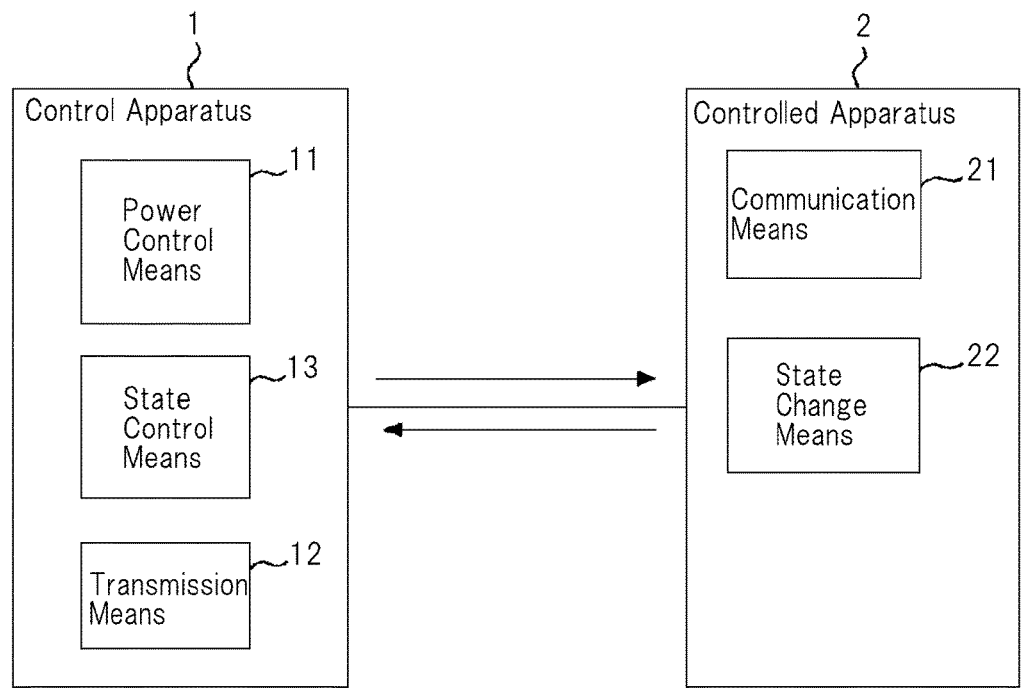
FIG. 1 is a block diagram showing an example of the configuration of the state control system of the present invention.
Figure 2:
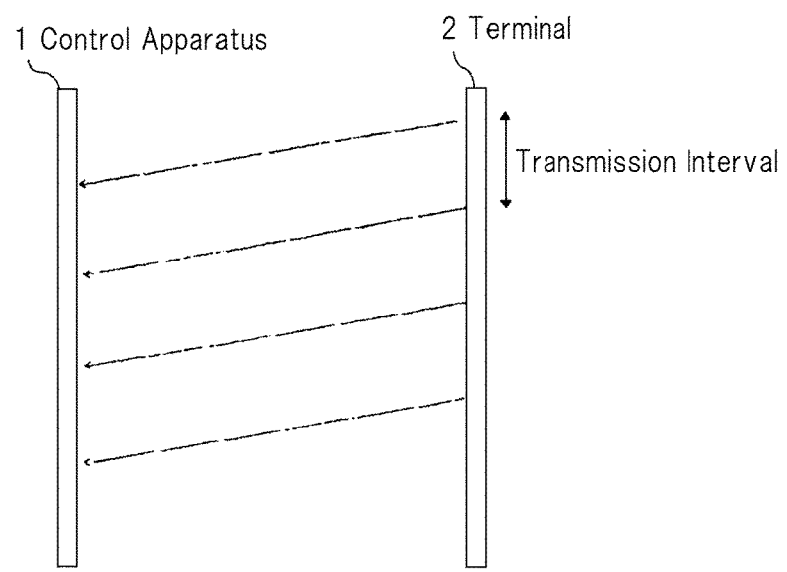
FIG. 2 is a sequence diagram showing an example of the operation of the controlled apparatus (terminal) shown in FIG. 1.

FIG. 1 is a block diagram showing an example of the configuration of the state control system of the present invention, and FIG. 2 is a sequence chart showing an example of the operation of the controlled apparatus shown in FIG. 1.

As shown in FIG. 1, the state control system of the present invention is of a configuration that is provided with control apparatus 1 and controlled apparatus 2. Control apparatus 1 and controlled apparatus 2 are capable of bidirectional transmission and reception of information and are connected so as to enable the supply of power from control apparatus 1 to controlled apparatus 2. The above-described PoE or PLC (Power Line Communications) are examples of methods of realizing this information communication and power supply. In the present invention, however, in contrast to PoE or PLC, control apparatus 1 is provided with, in addition to power control means 11 that controls the supply of power to controlled apparatus 2, transmission means 12 that transmits the above-described state information to controlled apparatus 2 and state control means 13 that uses the above-described state information to generate control commands to cause controlled apparatus 2 to change state. In addition, controlled apparatus 2 is provided with communication means 21 that communicates state information that indicates the current state of its own apparatus to control apparatus 1 and state change means 22 for changing the state of its own apparatus in accordance with state information.

Control apparatus 1 can be realized by a known information processor such as a computer that executes predetermined processing in accordance with, for example, a program, and that is provided with known communication capabilities for transmitting information to and receiving information from controlled apparatus 2. Controlled apparatus 2 is an electrical apparatus such as an IP telephone, illumination apparatus, monitor camera, or various types of sensors that is provided with, in addition to functions characteristic of the apparatus (main functions) and known communication functions for transmitting information to and receiving information from control apparatus 1, the above-described communication means 21 for communicating state information to controlled apparatus 2, and the above-described state change means 22 for changing the state in accordance with the state information. Communication means 21 and state change means 22 can each be realized by, for example, a processor such as a CPU or DSP that executes predetermined processing in accordance with, for example, a program, switches used for changing states, and a driver circuit for driving the switches.

FIG. 1 shows an example of a configuration in which control apparatus 1 and controlled apparatus 2 are connected one to one, but a plurality of controlled apparatuses 2 can be connected to control apparatus 1. In such cases, control apparatus 1 should be provided with a plurality of power control means 11, state control means 12, and transmission means 13 corresponding to each controlled apparatus 2.

As shown in FIG. 2, controlled apparatus (hereinbelow referred to as "terminal") 2 transmits information (state information) that indicates the current state of its own apparatus to control apparatus 1 for each predetermined period by means of communication means 22.

The state information that is transmitted from terminal 2 to control apparatus 1 includes a plurality of state parameters that correspond to various states of terminal 2 and identification information for identifying that terminal 2. The state parameters include parameters for verifying the type or specifications of terminal 2 and parameters used in communicating the state or changing the state of terminal 2. A MAC (Media Access Control) address that is a characteristic value assigned to terminal 2 at the time of fabrication should be used for the identification information.

In addition, the state information includes information that indicates the period of validity of the state information. The transmission interval of state information that is transmitted from terminal 2 to control apparatus 1 is set to a time interval that is shorter than the period of validity of the state information. No particular limitations are imposed on the format of frames that contain the state information and MAC address that are transmitted and received between control apparatus 1 and terminal 2, but a frame format similar to the above-described PoE and PLC is preferably used. The transmission interval of the state information or the period of validity of the state information need not be fixed. For example, the transmission interval may be made shorter in order to check the state frequently at the time of an emergency (the time of occurrence of an event, accident, fire, earthquake, etc.) and otherwise may be made longer to conserve power required in transmitting the state information.

Upon receiving state information from terminal 2, control apparatus 1 returns the state information without alteration (without changing the values of each state parameter) when not requesting a state change to terminal 2. This corresponds to ACK in typical communication (a response communication that indicates that data transfer has been properly terminated).

Alternatively, when requesting a change of state to terminal 2, control apparatus 1 changes, of the state information that has already been received from terminal 2, those state parameters that are the object of change to required values by means of state control means 13 and transmits state information that includes the state parameters that follow the change to the terminal. This state information that includes state parameters that follow the change is a control command for requesting a state change of terminal 2 from control apparatus 1. Control apparatus 1 is able to transmit a control command to terminal 2 at any timing without regard to the timing of reception of state information that is periodically transmitted from terminal 2.

Terminal 2 that has received the control command from control apparatus 1 verifies whether there has been a change of each state parameter by means of state change means 22, changes the states in accordance with the state parameters that follow the change, and upon completing the change of state, uses communication means 21 to transmit to control apparatus 1 state information that indicates the state of its own apparatus following the change. The state information that is transmitted from terminal 2 to control apparatus 1 at this time corresponds to an ACK to a control command.

In addition, when the state of its own apparatus is changed without a control command from control apparatus 1, terminal 2 immediately reports to control apparatus 1 by means of communication means 21 state information that indicates the state of its own apparatus after the change.

When either one of terminal 2 or control apparatus 1 changes the period of validity, the transmission and reception of the above-described state information brings about updating to the period of validity that follows the change in the other apparatus. In this way, the state information held by control apparatus 1 and terminal 2 can be matched.

In the present exemplary embodiment, control apparatus 1 and terminal 2 transmit and receive state information of the same data construction, i.e., state information in which the arrangement of each state parameter within a frame is identical. As a result, processes for generating and changing state information and processes for analyzing each state parameter of the state information that is received can be easily realized.

State parameters that are transmitted and received by control apparatus 1 and terminal 2 include, for example: the type of terminal 2 (network camera, illumination apparatus, IP telephone, fire alarm, emergency light, etc.); the vendor name of terminal 2; the fabrication number of terminal 2; information indicating whether terminal 2 is an apparatus to which the present invention applies (for example, information indicating the authorizing organization and the authorization number); the priority of terminal 2; the priority after timer termination; a timer; a timer set value; a forcing trigger; the required power in terminal 2 (requested power); the power that can be supplied to terminal 2 from control apparatus 1 (supplied power); whether terminal 2 is using an AC adapter (existence of an AC-ADP); whether terminal 2 incorporates a battery (existence of battery); when the battery is a secondary battery, whether the battery is in a charging state or discharging state (battery state); whether terminal 2 has a sleep function (existence of sleep); when terminal 2 has a sleep function, whether terminal 2 is in the sleep state (sleep state); when terminal 2 has a sleep function, the power consumption when sleeping; when terminal 2 has a sleep function, the sleep control bits for causing transition to the sleep state or for causing recovery from the sleep state; whether terminal 2 has a power-source switch (existence of power-source switch); when terminal 2 has a power-source switch, the state of the power-source switch (ON/OFF); the power-source control bits used for turning ON/OFF the main power-source of terminal 2; and the power-supply control bits used in controlling the supply of power from control apparatus 1 to terminal 2.

Priority is used in judging whether to operate terminal 2 at the time of occurrence of some type of event. For example, setting a high priority to an apparatus that is necessary at the time of an emergency can be considered. In such cases, control apparatus 1 may continue to supply power for terminal 2 that has high priority during an emergency (such as an emergency light or a broadcast speaker for reporting the occurrence of an emergency state) and may halt the supply of power for terminal 2 that has low priority (such as an illumination apparatus other than an emergency light or an IP telephone other than a telephone for reporting an emergency).

Methods of halting power to terminal 2 include: (1) a method of halting all functions of terminal 2 (also halting communication means 21 and state change means 22), and (2) a method of supplying power to communication means 21 and state change means 22 and halting power supply to the main functions of terminal 2 (for example, when terminal 2 is an illumination apparatus, turning off the illumination and supplying power to communication functions). In the case of (1), the recovery of terminal 2 should be brought about by supplying power from control apparatus 1. In the case of (2), recovery should be brought about by transmitting a control command from control apparatus 1 to terminal 2 requesting recovery.

In the state control system of the present exemplary embodiment, terminal 2 is assumed to be able to communicate "control refusal" or "control permission" to control apparatus 1 as regards the power-source control of terminal 2 by control apparatus 1, the power-supply control of terminal 2 by control apparatus 1, and the sleep control of terminal 2 by control apparatus 1. When terminal 2 uses predetermined bits to report "control refusal," control apparatus 1 as a rule is assumed to be unable to implement power-source control, power-supply control, or sleep control of terminal 2. The above-described forcing trigger is used when forcibly changing the state of terminal 2 when terminal 2 has refused power-source control, power-supply control, or sleep control by means of control apparatus 1. Power-source control is the turning ON or OFF of the main power-source that supplies power to the main functions of terminal 2 and refers to the state of supplying power to the communication functions of terminal 2 (communication means 21 and state change means 22). Power-supply control is the turning ON or OFF of the power supply to all functions of terminal 2 that include communication functions and main functions. Sleep control refers to turning ON or OFF the supply of power to required functions that include the above-described communication functions and that exclude the main functions of terminal 2.

The above-described timer is used in setting the time interval until terminal 2 transitions to a predetermined state. For example, when a surveillance image realized by a camera or a detection result realized by a sensor is recorded at a predetermined period or at predetermined times, the timer is used in setting the period or times. The timer set value is used when the value of the time provided in terminal 2 is changed from control apparatus 1. The priority after timer termination is used when changing priority after the passage of a time interval that is set by the timer. The priority of terminal 2 need not be fixed for each terminal 2, a change of priority according to conditions being desirable in some cases. For example, in terminal 2 in which priority is high at the time of an emergency (such as the above-described broadcast speaker) and in which priority is otherwise low, the priority after timer termination may be used to implement a process of lowering priority after the passage of a designated time interval.

The construction shown in FIG. 1 is of a configuration in which power is supplied from control apparatus 1 to terminal 2, whereby power-supply control to terminal 2 can basically be realized at control apparatus 1. However, when terminal 2 is provided with a secondary battery, the power of the secondary battery can be used to always activate communication functions and control apparatus 1 can use the above-described power-source control bits to control supply or halting of power to the main functions of terminal 2. Alternatively, when terminal 2 is provided with a secondary battery and power is not being supplied from control apparatus 1 to terminal 2, state information can be used to request, from terminal 2 to control apparatus 1, starting of the power supply. Because a secondary battery is normally used together with a circuit for protecting against overcharge or over-discharge or a circuit for measuring the amount of stored electricity, when terminal 2 is provided with, for example, a CPU, the amount of stored electricity of the secondary battery can be periodically monitored and state information can then be used to issue a request to control apparatus 1 for charging when the amount of stored electricity is low.

The operation of control apparatus 1 and controlled apparatus 2 shown in FIG. 1 is next described with reference to the accompanying drawings.

Figure 3:
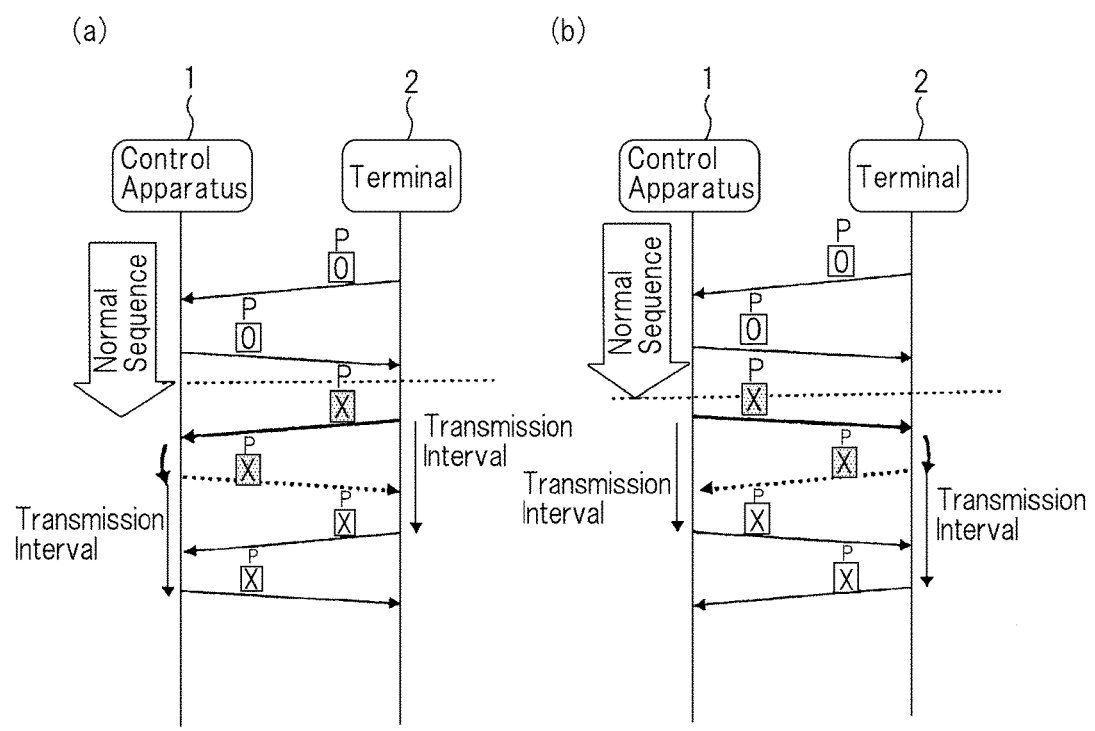
FIG. 3 is a sequence diagram showing an example of the operation when a terminal and a control apparatus transmit and receive state information.

FIG. 3 is a sequence diagram showing an example of the operation when a terminal and a control apparatus transmit and receive state information. FIG. 3(*a*) shows an example of the operation when terminal 2 itself changes its own state, and FIG. 3(*b*) shows an example of operation when control apparatus 1 requests a state change of terminal 2.

As shown in FIGS. 3(*a*) and (*b*), terminal 2 transmits state information to control apparatus 1 at predetermined transmission intervals, and if not requesting a state change of that terminal 2, control apparatus 1 returns the state information that was received from terminal 2 to terminal 2 without alteration. The state in which terminal 2 and control apparatus 1 transmit and receive state information without changing the state information in this way is referred to as a normal sequence. FIGS. 3(*a*) and (*b*) show an example in which terminal 2 and control apparatus 1 transmit and receive state information that includes a value "0" in state parameter P at the time of the normal sequence.

As shown in FIG. 3(*a*), when terminal 2 transitions from the above-described normal sequence to a state corresponding to a value "x" in state parameter P, terminal 2 transmits state information that includes the value "x" in state parameter P to control apparatus 1. At this time, control apparatus 1 does not request a state change of terminal 2 and therefore returns to terminal 2 the state information that was received from terminal 2 without alteration (ACK). Terminal 2 and control apparatus 1 subsequently return to the normal sequence and state information including the value "x" in state parameter P is periodically transmitted and received.

On the other hand, as shown in FIG. 3(*b*), when control apparatus 1 requests a state change to terminal 2 from the above-described normal sequence, control apparatus 1 transmits to terminal 2 state information that follows the change (a control command) that includes, for example, the value "x" in state parameter P. Terminal 2 that has received the control command has not reached the next state information transmission time and therefore transitions to the state corresponding to the value "x" in state parameter P in accordance with the control command and returns state information that includes the value "x" in state parameter P to the control apparatus (ACK). Terminal 2 and control apparatus 1 subsequently return to the normal sequence and periodically transmit and receive state information that includes the value "x" in state parameter P.

Figure 4:
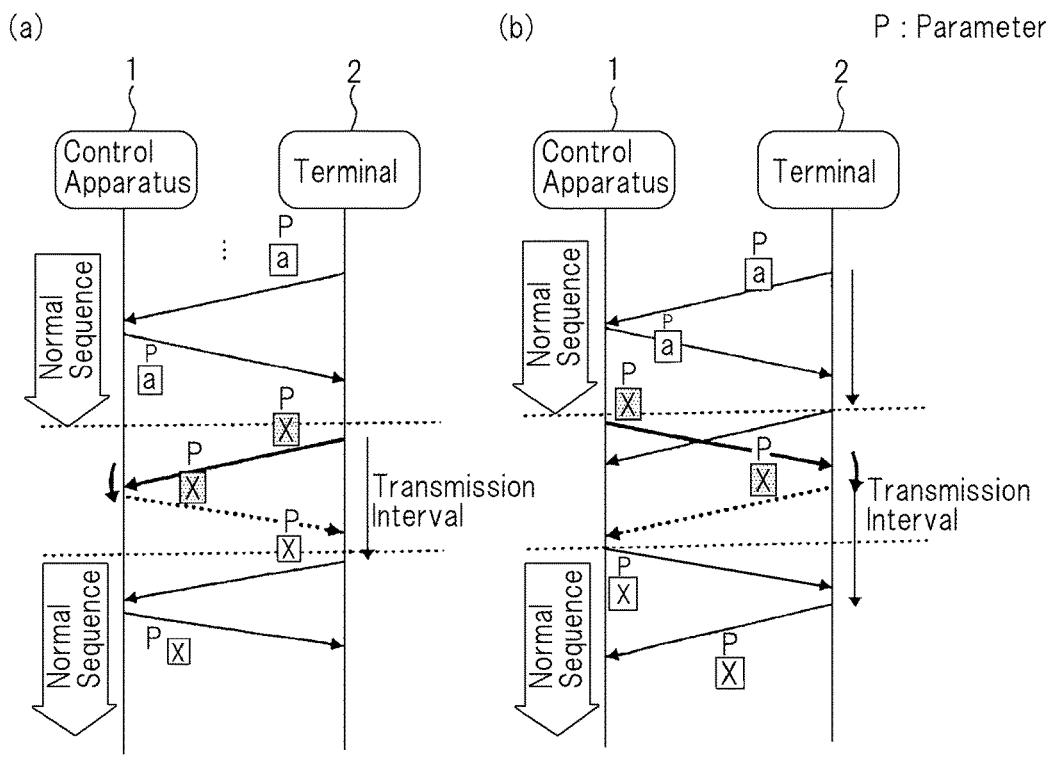
FIG. 4 is a sequence diagram showing another example of the operation when a terminal and a control apparatus transmit and receive state information.

FIG. 4 is a sequence diagram showing another example of the operation when a terminal and a control apparatus transmit and receive state information. FIG. 4(*a*) shows an example of operation when terminal 2 itself changes its state, and FIG. 4(*b*) shows an example of operation when control apparatus 1 requests a state change of terminal 2. FIGS. 4(*a*) and (*b*) show examples in which terminal 2 and control apparatus 1 transmit and receive state information that includes a value "a" in state parameter P during the normal sequence.

As shown in FIG. 4(*a*), when terminal 2 transitions from the above-described normal sequence to a state corresponding to the value "x" of state parameter P, terminal 2 transmits to control apparatus 1 state information that includes the value "x" in state parameter P. At this time, control apparatus 1 is not requesting a state change of terminal 2 and therefore returns the state information that was received from terminal 2 to terminal 2 without alternation (ACK). Terminal 2 and control apparatus 1 subsequently return to the normal sequence and periodically transmit and receive state information that includes the value "x" in state parameter P.

On the other hand, when control apparatus 1 requests a state change to terminal 2 from the above-described normal sequence as shown in FIG. 4(b), control apparatus 1 transmits to terminal 2 state information (control command) that follows the change that includes, for example, the value "x" in state parameter P. Terminal 2 here has reached the next state information transmission time before receiving the control command that was transmitted from control apparatus 1 and therefore has already transmitted to control apparatus 1 state information that includes the value "a" in state parameter P.

When this type of crossing of transmissions occurs, the state information received from terminal 2 differs from the control command that control apparatus 1 transmitted immediately before, and control apparatus 1 therefore ignores the state information that was received from terminal 2. In addition, when there is no response (ACK) to the control command from terminal 2 despite the passage of the effective interval that is included in the previously transmitted control command, control apparatus 1 resends the same control command.

Upon receiving the control command that includes the value "x" in state parameter P from control apparatus 1, terminal 2 transitions to the state that corresponds to the value "x" of state parameter P in accordance with the control command and returns to control apparatus 1 state information that includes the value "x" in state parameter P (ACK). Terminal 2 and control apparatus 1 subsequently return to the normal sequence and periodically transmit and receive state information that includes the value "x" in state parameter P.

Figure 5:
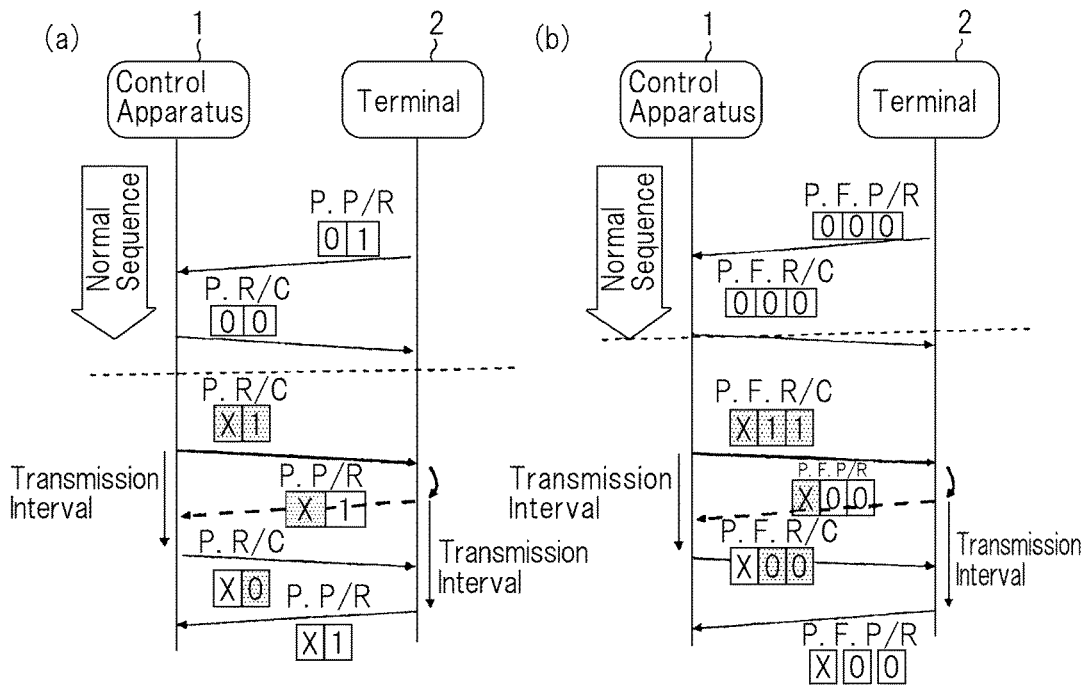
FIG. 5 is a sequence diagram showing another example of the operation when a terminal and a control apparatus transmit and receive state information.

FIG. 5 is a sequence diagram showing another example of operation when a terminal and control apparatus transmit and receive state information. FIG. 5(a) shows an example of operation when terminal 2 permits a state change, and FIG. 5(b) shows an example of operation when terminal 2 refuses a state change. In addition, FIGS. 5(a) and (b) show a state in which terminal 2 and control apparatus 1 transmit and receive state information that includes a value "0" in state parameter P.

As shown in FIG. 5(a), terminal 2 transmits to control apparatus 1 at predetermined transmission intervals state information that includes the value "0" in state parameter P and a value "1" that indicates control permission of this P, and control apparatus 1 returns to terminal 2 state information that includes the value "0" in state parameter P and a value "0" that indicates that state control of this P is not to be implemented (control cancellation) during the normal sequence.

When control apparatus 1 is requesting a state change to terminal 2 from the above-described normal sequence, control apparatus 1 transmits to terminal 2 state information that follows the change (a control command) that includes, for example, a value "x" in state parameter P and a value "1" that indicates a request to change this P. Terminal 2 that has received the control command transitions to a state that corresponds to the value "x" of state parameter P in accordance with the control command and returns to the control apparatus state information that follows the change that includes the value "x" in state parameter P and the value "1" that indicates control permission of this P (ACK). Terminal 2 and control apparatus 1 subsequently return to the normal sequence, control apparatus 1 transmitting to terminal 2 state information that includes the value "x" in state parameter P and the value "0" that indicates control cancellation of this P, and terminal 2 transmitting to control apparatus 1 state information that includes the value "x" in state parameter P and the value "1" that indicates control permission of this P.

As shown in FIG. 5(b), terminal 2 transmits at predetermined transmission intervals to control apparatus 1 state information that includes a value "0" in state parameter P and a value "0" that indicates control refusal of this P, and control apparatus 1 returns to terminal 2 state information that includes the value "0" in state parameter P and the value "0" that indicates control cancellation of this P.

When control apparatus 1 is requesting state change to terminal 2 from the above-described normal sequence, control apparatus 1 transmits to terminal 2 state information that follows the change (a control command) that includes, for example, a value "x" in state parameter P, a value "1" that indicates a change request of this P, and a value "1" that requests forcible change. Terminal 2, having received the control command, transitions to the state that corresponds to the value "x" of state parameter P in accordance with the control command and returns to control apparatus 1 state information that includes the value "x" in state parameter P, a value "1" that indicates control permission of this P, and a value "0" that indicates normal time in which a forcible change is not requested (ACK). Terminal 2 and control apparatus 1 subsequently return to the normal sequence, control apparatus 1 transmitting to terminal 2 state information that includes the value "x" in state parameter P, the value "0" that indicates control cancellation of this P, and the value "0" that indicates normal time in which forcible change is not requested, and terminal 2 transmitting to control apparatus 1 state information that includes the value "x" in state parameter P, the value "0" that indicates control refusal of this P, and the value "0" that indicates normal time in which forcible change is not requested.

More specific examples of the operation of control apparatus 1 and terminal 2 of the present exemplary embodiment are next described using FIG. 6-FIG. 16.

Figure 6:
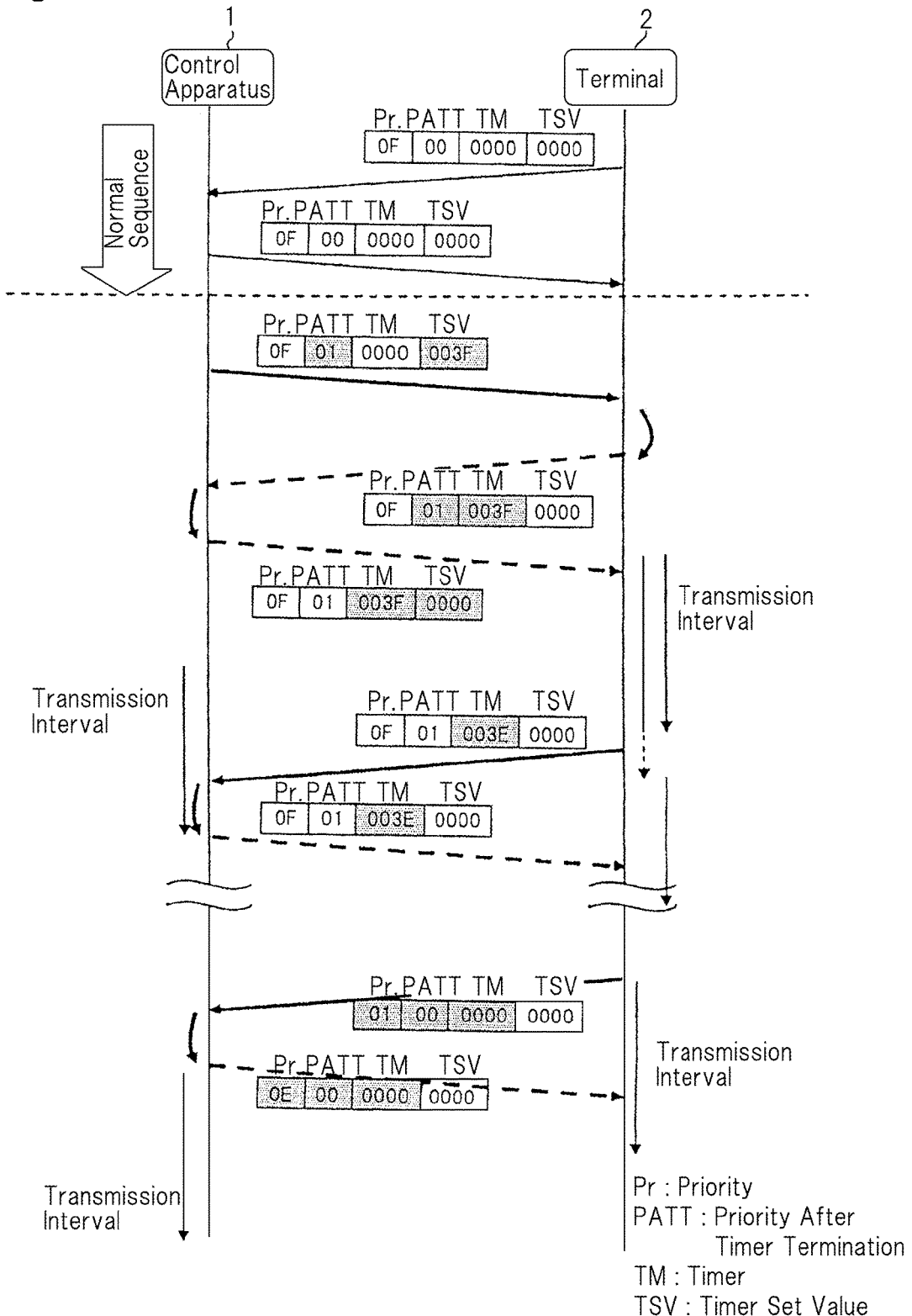
FIG. 6 is a sequence diagram showing a specific example of the operation when a terminal and a control apparatus transmit and receive state information.

FIG. 6 is a sequence diagram showing a specific example of the operation when a terminal and a control apparatus transmit and receive state information. FIG. 6 shows an example of operation when the "priority after timer termination" is used to change the current priority "0F" of terminal 2 to priority "01" at "after 3F minutes." In addition, FIG. 6 shows a state in which, during the normal sequence, terminal 2 and control apparatus 1 transmit and receive state information in which a value "00" is set in "priority after timer termination," a value "0000" is set in the timer, and a value "0000" is set in the timer set value.

As shown in FIG. 6, during the normal sequence, terminal 2 transmits to control apparatus 1 at predetermined transmission intervals state information that includes a value "00" in the "priority after timer termination," a value "0000" in the timer, and a value "0000" in the timer set value, and control apparatus 1 returns to terminal 2 state information that includes the value "00" in the "priority after timer termination," the value "0000" in the timer, and the value "0000" in the timer set value.

When control apparatus 1 requests change of the "priority after timer termination" from the above-described normal sequence, control apparatus 1 transmits to terminal 2 state information (a control command) that includes, for example, a value "0F" that indicates the current priority, a value "01" of the priority after timer termination, a value "0000" of the timer, and a value "003F" of the timer set value. Terminal 2 that has received the control command sets the value "003F"

in the timer in accordance with the control command and transmits to control apparatus 1 state information that includes the value "003F" of the timer after the change and the value "0000" of the cleared timer set value. At this time, control apparatus 1 returns to terminal 2 the state information that includes the priority, the priority after timer termination, the timer, and the timer set value that was received from terminal 2 without alteration.

Terminal 2 in which the value "003F" has been set in the timer transmits to control apparatus 1 state information that includes the values ("003E", "003D", . . . , "0000") of the timer after the change each time the value of the timer decreases by "1" (for example, each minute). Control apparatus 1 returns this state information to terminal 2 without alteration with each reception of the state information from terminal 2.

When the value of the timer becomes "0000", terminal 2 changes the priority from "0F" to "01" and transmits to control apparatus 1 state information that includes the priority after change "01" as well as the priority after timer termination, the timer, and the timer set value for which the values were cleared.

Terminal 2 and control apparatus 1 subsequently return to the normal sequence, control apparatus 1 and terminal 2 transmitting and receiving state information that includes the value "01" in the priority, the value "00" in the priority after timer termination, the value "0000" in the timer, and the value "0000" in the timer set value.

Figure 7:
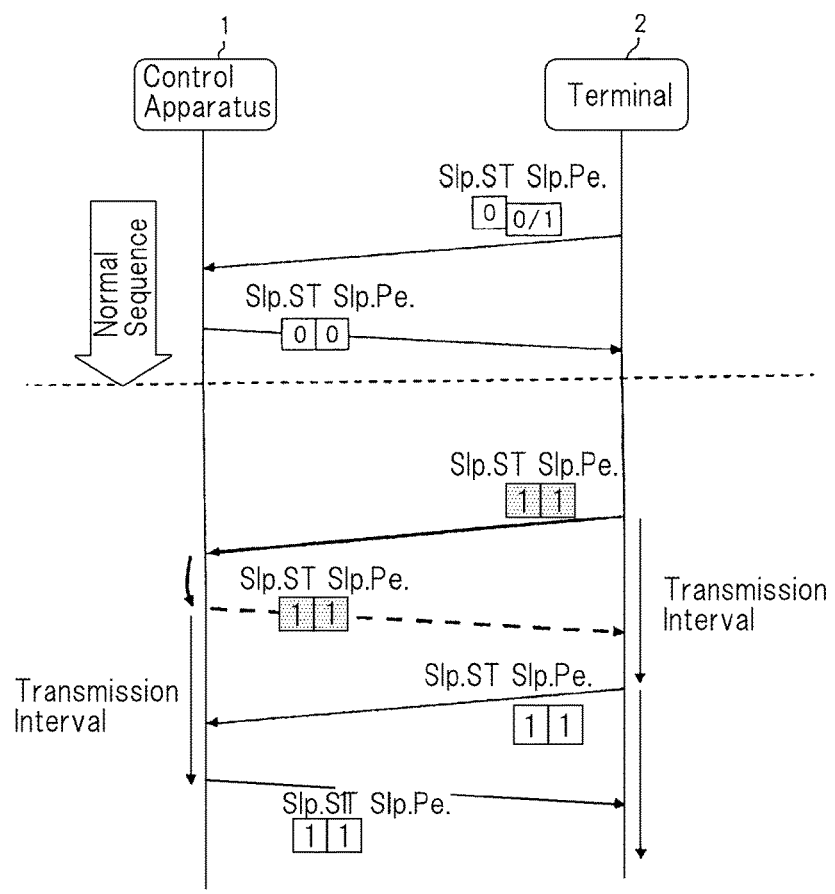
FIG. 7 is a sequence diagram showing a specific example of the operation when a terminal and a control apparatus transmit and receive state information.

FIG. 7 is a sequence diagram showing a specific example of the operation when a terminal and a control apparatus transmit and receive state information. FIG. 7 shows an example of operation when terminal 2 transitions to a sleep state from the normal operation time and reports the change to the sleep state to control apparatus 1.

As shown in FIG. 7, during the normal sequence, terminal 2 transmits to control apparatus 1 at predetermined transmission intervals state information that includes a value "0" that indicates the Sleep OFF state and a value "0/1" that indicates refusal or permission of sleep control, and control apparatus 1 returns to terminal 2 state information that includes the value "0" that indicates the sleep OFF state and a value "0" that indicates sleep cancellation.

When terminal 2 transitions from the above-described normal sequence to the sleep state, terminal 2 transmits to control apparatus 1 state information that includes a value "1" that indicates the sleep ON state and a value "1" that indicates sleep control permission. At this time, control apparatus 1 is not requesting state change of terminal 2, and therefore returns to terminal 2 the state information that was received from terminal 2 (ACK) that includes the value "1" that indicates the sleep ON state and a value "1" that indicates the sleep request. Terminal 2 and control apparatus 1 subsequently return to the normal sequence, terminal 2 transmitting to control apparatus 1 state information that includes the value "1" that indicates the sleep ON state and the value "1" that indicates sleep control permission, and control apparatus 1 transmitting to terminal 2 state information that includes the value "1" that indicates the sleep ON state and the value "1" that indicates the sleep request.

Figure 8:
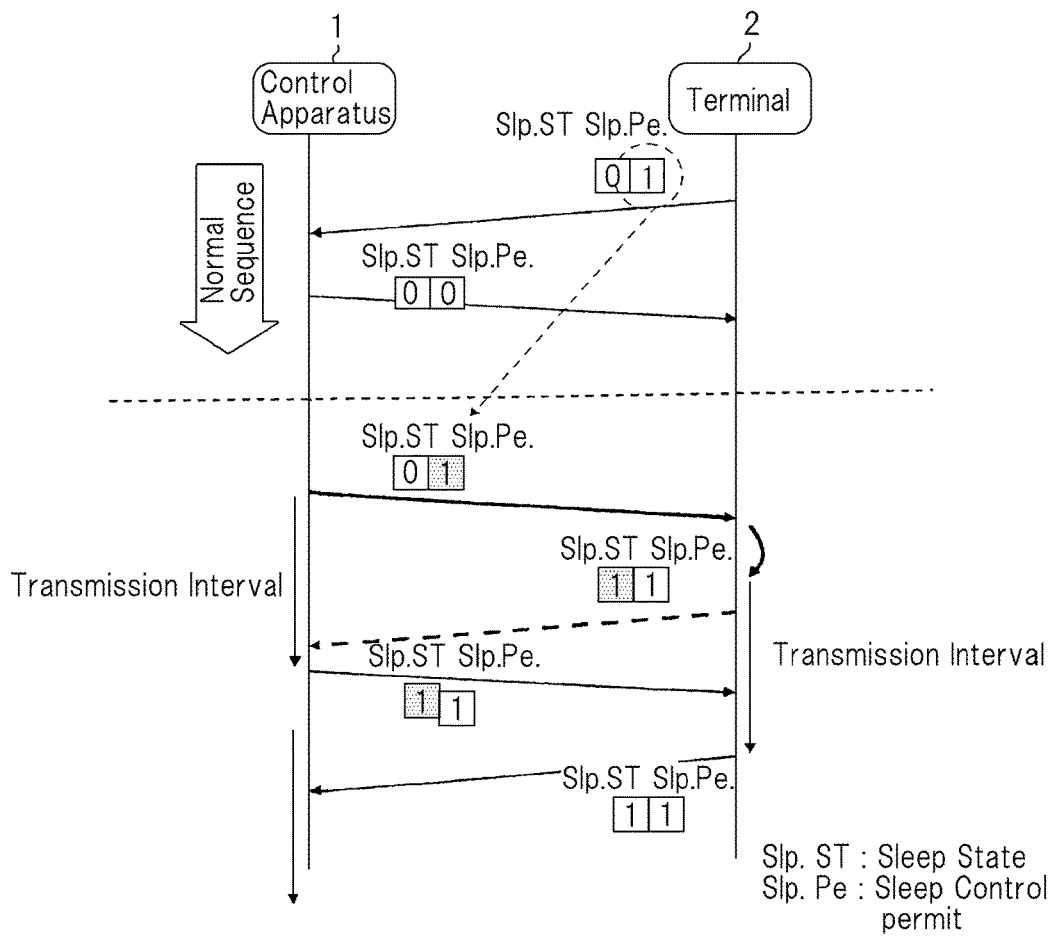
FIG. 8 is a sequence diagram showing a specific example of the operation when a terminal and a control apparatus transmit and receive state information.

FIG. 8 is a sequence diagram showing a specific example of the operation when a terminal and a control apparatus transmit and receive state information. FIG. 8 shows an example of operation in which control apparatus 1 requests terminal 2 to transition to the sleep state.

As shown in FIG. 8, during the normal sequence, terminal 2 transmits to control apparatus 1 at predetermined transmission intervals state information that includes a value "0" that indicates the sleep OFF state and a value "1" that indicates sleep control permission, and control apparatus 1 returns to terminal 2 state information that includes the value "0" that indicates the sleep OFF state and a value "0" that indicates sleep cancellation.

When control apparatus 1, from the above-described normal sequence, requests terminal 2 to transition to the sleep state, control apparatus 1 transmits to terminal 2 state information that includes, for example, a value "0" that indicates the sleep OFF state and a value "1" that indicates a sleep request. Upon receiving the sleep request from control apparatus 1, terminal 2 transitions to the sleep state and transmits to control apparatus 1 state information that includes the value "1" that indicates the sleep ON state and a value "1" that indicates sleep control permission. Terminal 2 and control apparatus 1 subsequently return to the normal sequence, terminal 2 transmitting to control apparatus 1 state information that includes the value "1" that indicates the sleep ON state and the value "1" that indicates sleep control permission, and control apparatus 1 transmitting to terminal 2 state information that includes the value "1" that indicates the sleep ON state and the value "1" that indicates the sleep request.

Figure 9:
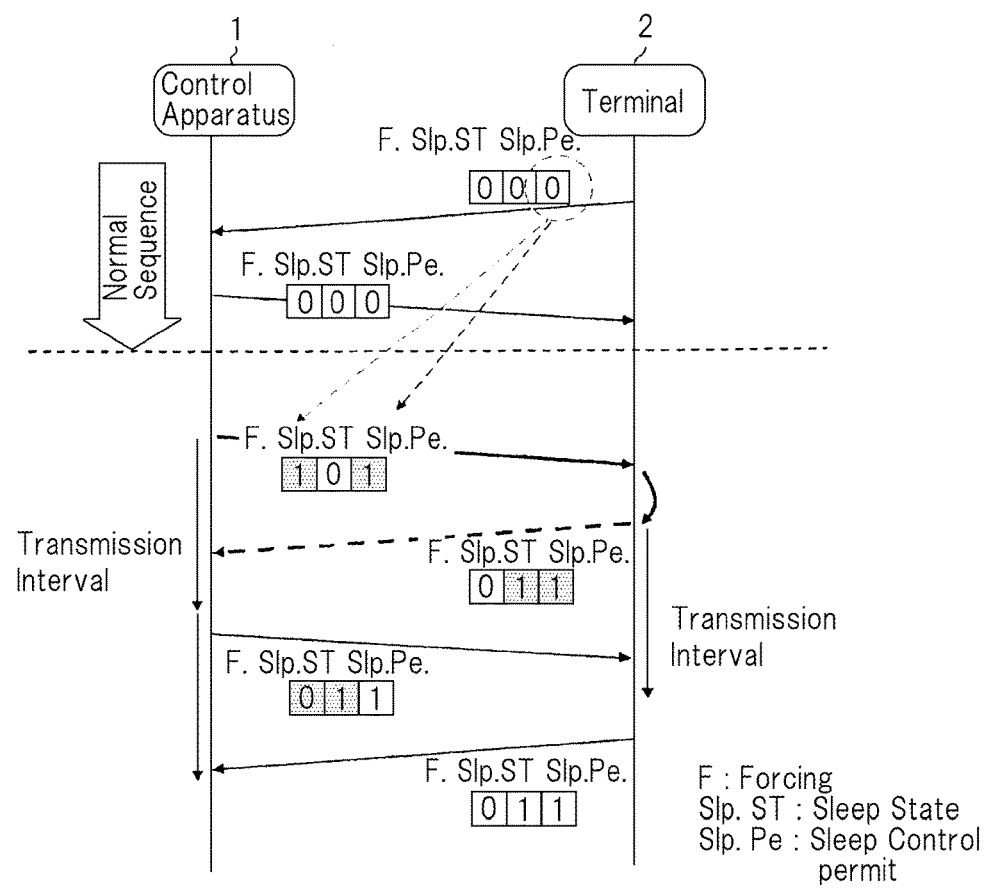
FIG. 9 is a sequence diagram showing a specific example of the operation when a terminal and a control apparatus transmit and receive state information.

FIG. 9 is a sequence diagram that shows a specific example of the operation when a terminal and control apparatus transmit and receive state information. FIG. 9 shows an example of operation in which control apparatus 1 forcibly causes terminal 2 that is refusing to allow sleep control to transition to the sleep state.

As shown in FIG. 9, during the normal sequence, terminal 2 transmits to control apparatus 1 at predetermined transmission intervals state information that includes a value "0" that indicates the sleep OFF state, a value "1" that indicates sleep control refusal, and a value "0" that indicates normal time in which forcible change is not requested, and control apparatus 1 returns to terminal 2 state information that includes the value "0" that indicates the sleep OFF state, a value "0" that indicates sleep cancellation, and the value "0" that indicates normal time in which forcible change is not requested.

When control apparatus 1, from the above-described normal sequence, requests terminal 2 to transition to the sleep state, terminal 2 is reporting "refusal" of sleep control, and control apparatus 1 therefore transmits to terminal 2 state information that includes, for example, the value "0" that indicates the sleep OFF state, a value "1" that indicates a sleep request, and a value "1" that requests forcible change. Upon receiving the sleep request that includes forcible change from control apparatus 1, terminal 2 transitions to the sleep state and transmits to control apparatus 1 state information that includes a value "1" that indicates the sleep ON state, a value "1" that indicates sleep control permission, and the value "0" that indicates normal time in which forcible change is not requested. Terminal 2 and control apparatus 1 subsequently return to the normal sequence, terminal 2 transmitting to control apparatus 1 state information that includes the value "1" that indicates the sleep ON state, the value "1" that indicates sleep control permission, and the value "0" that indicates normal time in which forcible change is not requested, and control apparatus 1 transmitting to terminal 2 state information that includes the value "1" that indicates the sleep ON state, the value "1" that indicates the sleep request, and the value "0" that indicates a normal time in which forcible change is not requested.

Figure 10:
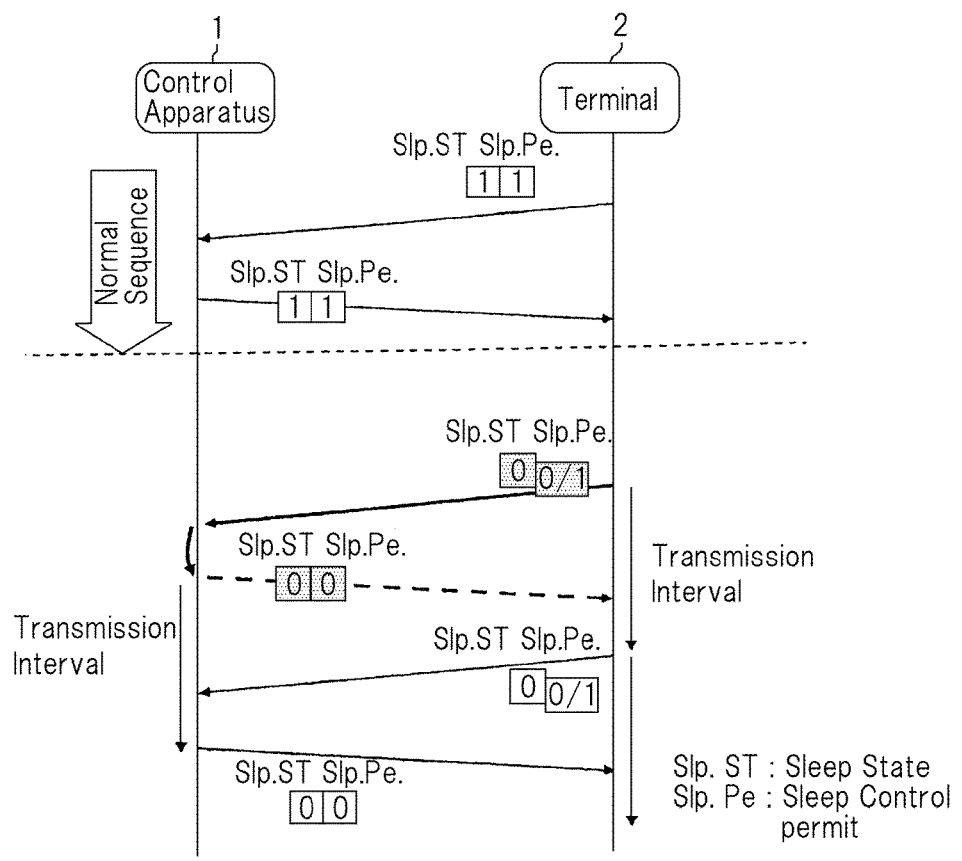
FIG. 10 is a sequence diagram showing a specific example of the operation when a terminal and a control apparatus transmit and receive state information.

FIG. 10 is a sequence diagram that shows a specific example of the operation when a terminal and a control apparatus transmit and receive state information. FIG. 10 shows an example of operation in which terminal 2 that is in a sleep state itself cancels the sleep state and reports the state change to control apparatus 1.

As shown in FIG. 10, during the normal sequence, terminal 2 transmits to control apparatus 1 at predetermined transmission intervals state information that includes the value "1" that indicates the sleep ON state and the value "1" that indicates sleep control permission, and control apparatus 1 returns to terminal 2 state information that includes the value "1" that indicates the sleep ON state and the value "1" that indicates a sleep request.

When, from the above-described normal sequence, terminal 2 cancels the sleep state, terminal 2 transmits to control apparatus 1 state information that includes a value "0" that indicates the sleep OFF state and a value "0/1" that indicates sleep control refusal/permission. At this time, control apparatus 1 is not requesting a state change of terminal 2 and therefore returns to terminal 2 the state information that was received from terminal (ACK) that includes the value "0" that indicates a sleep OFF state and the value "0" that indicates sleep cancellation. Terminal 2 and control apparatus 1 subsequently return to the normal sequence, terminal 2 transmitting to control apparatus 1 state information that includes the value "0" that indicates the sleep OFF state and the value "0 (/1)" that indicates sleep control refusal (/permission), and control apparatus 1 transmitting to terminal 2 state information that includes the value "0" that indicates the sleep OFF state and the value "0" that indicates sleep cancellation.

Figure 11:
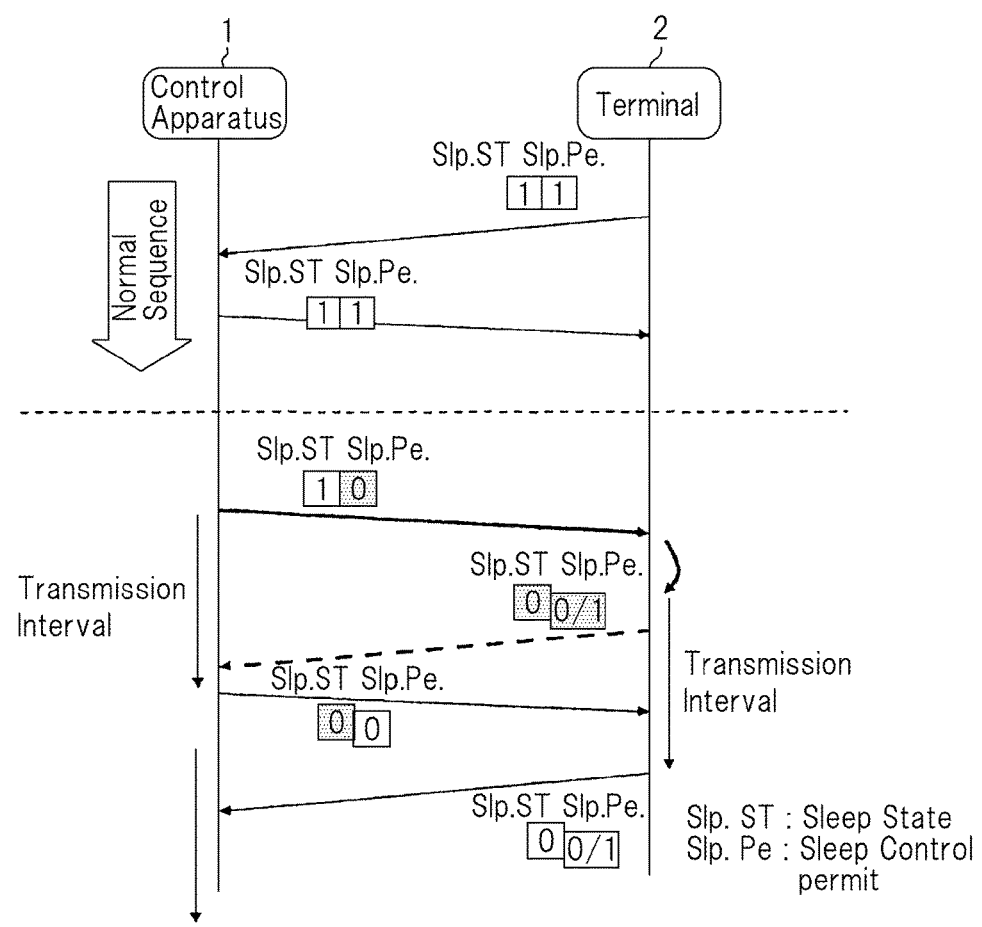
FIG. 11 is a sequence diagram showing a specific example of the operation when a terminal and a control apparatus transmit and receive state information.

FIG. 11 is a sequence diagram that shows a specific example of the operation when a terminal and a control apparatus transmit and receive state information. FIG. 11 shows an example of operation in which sleep is cancelled in terminal 2 that is in the sleep state from control apparatus 1.

As shown in FIG. 11, during the normal sequence, terminal 2 transmits to control apparatus 1 at predetermined transmission intervals state information that includes the value "1" that indicates the sleep ON state and the value "1" that indicates sleep control permission, and control apparatus 1 returns to terminal 2 state information that includes the value "1" that indicates the sleep ON state and a value "1" that indicates a sleep request.

When control apparatus 1 requests cancellation of the sleep state to terminal 2 from the above-described normal sequence, terminal 2 is reporting "permission" of sleep control and control apparatus 1 therefore transmits to terminal 2 state information that includes the value "1" that indicates the sleep ON state and the value "0" that requests cancellation of sleep. Upon receiving the sleep cancellation request from control apparatus 1, terminal 2 cancels the sleep state and transmits to control apparatus 1 state information that includes the value "0" that indicates the sleep OFF state and the value "0 (/1)" that indicates sleep refusal (/permission). Terminal 2 and control apparatus 1 subsequently return to the normal sequence, terminal 2 transmitting to control apparatus 1 state information that includes the value "0" that indicates the sleep OFF state and the value "0 (/1)" that indicates sleep refusal (/permission), and control apparatus 1 transmitting to terminal 2 state information that includes the value "0" that indicates the sleep OFF state and the value "0" that indicates sleep cancellation.

Figure 12:
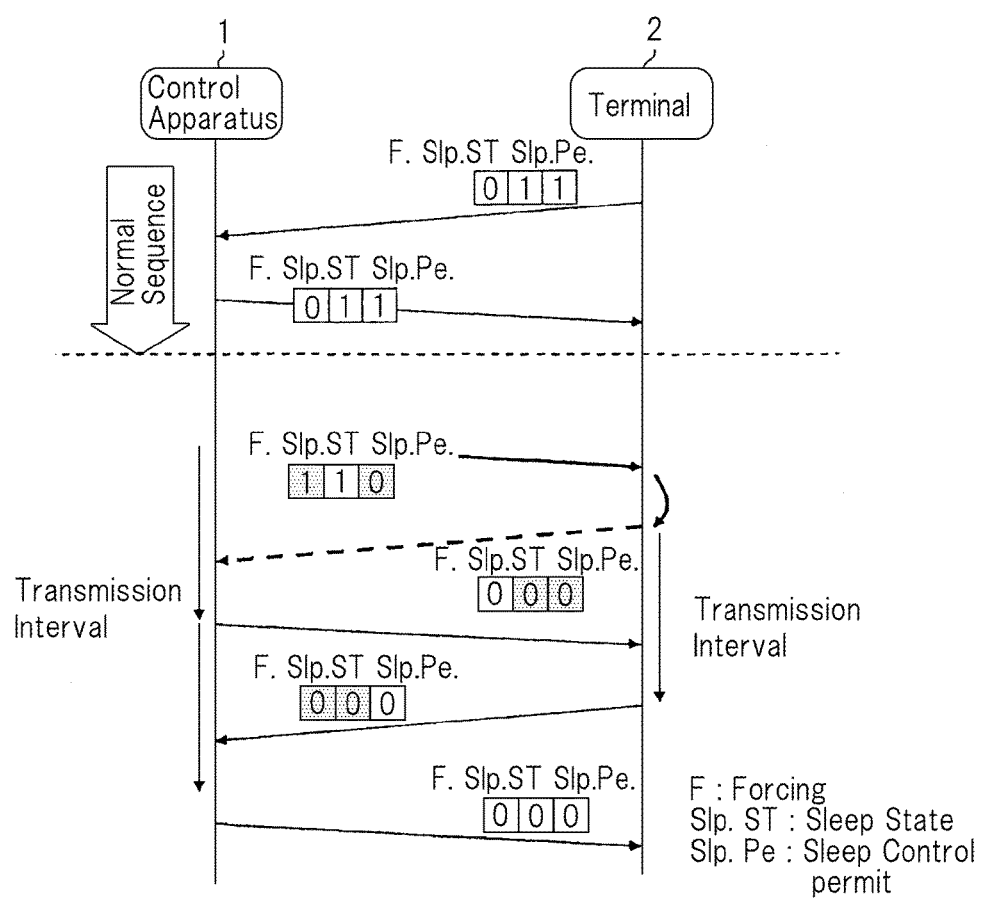
FIG. 12 is a sequence diagram showing a specific example of the operation when a terminal and a control apparatus transmit and receive state information.

FIG. 12 is a sequence diagram showing a specific example of the operation when a terminal and a control apparatus transmit and receive state information. FIG. 12 shows an example of operation in which terminal 2 that is in the sleep state and that is refusing to allow sleep control is forcibly caused to cancel sleep from control apparatus 1.

As shown in FIG. 12, during the normal sequence, terminal 2 transmits to control apparatus 1 at predetermined transmission intervals state information that includes the value "1" that indicates the sleep ON state, a value "0" that indicates sleep control refusal, and the value "0" that indicates normal time in which forcible change is not requested, and control apparatus 1 returns to terminal 2 state information that includes the value "1" that indicates the sleep ON state, the value "1" that indicates a sleep request, and the value "0" that indicates normal time in which forcible change is not requested.

When control apparatus 1 requests cancellation of the sleep state in terminal 2 from the above-described normal sequence, terminal 2 is reporting "refusal" of sleep control and control apparatus 1 therefore transmits to terminal 2 state information that includes the value "1" that indicates the sleep ON state, the value "0" that requests sleep cancellation, and the value "1" that requests forcible change. Upon receiving the sleep cancellation request that includes forcible change from control apparatus 1, terminal 2 cancels the sleep state and transmits to control apparatus 1 state information that includes the value "0" that indicates the sleep OFF state, the value "0" that indicates sleep control refusal, and the value "0" that indicates normal time in which forcible change is not requested. Terminal 2 and control apparatus 1 subsequently return to the normal sequence, terminal 2 transmitting to control apparatus 1 state information that includes the value "0" that indicates the sleep OFF state, the value "0" that indicates sleep control refusal, and the value "0" that indicates normal time in which forcible change is not requested, and control apparatus 1 transmitting to terminal 2 state information that includes the value "0" that indicates the sleep OFF state, the value 0" that indicates sleep cancellation, and the value "0" that indicates normal time in which forcible change is not requested.

Figure 13:
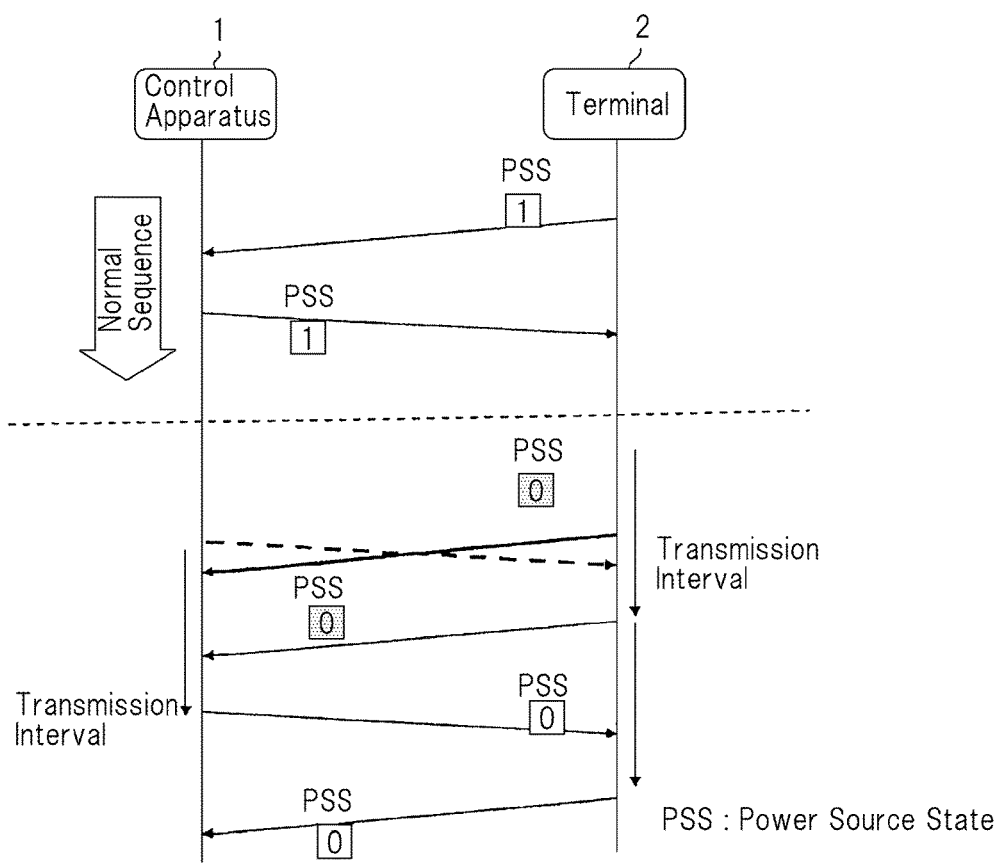
FIG. 13 is a sequence diagram showing a specific example of the operation when a terminal and a control apparatus transmit and receive state information.

FIG. 13 is a sequence diagram showing a specific example of the operation when a terminal and a control apparatus transmit and receive state information. FIG. 13 shows an example of operation in which terminal 2 transitions to the OFF state of the main power-source from the time of normal operation and reports to control apparatus 1 the change to the main power-source OFF state.

As shown in FIG. 13, during the normal sequence, terminal 2 transmits to control apparatus 1 at predetermined transmission intervals state information that includes a value "1" that indicates the main power-source ON state, and control apparatus 1 returns to terminal 2 state information that includes the value "1" that indicates the main power-source ON state.

Upon transitioning to the main power-source OFF state of terminal 2 from the above-described normal sequence, terminal 2 transmits to control apparatus 1 state information that includes a value "0" that indicates the main power-source OFF state. At this time, control apparatus 1 is not requesting a state change of terminal 2 and therefore returns to terminal 2 the state information that was received from terminal 2 (ACK) that includes the value "0" that indicates the main power-source OFF state. When control apparatus 1 here transmits to terminal 2 state information that includes a value "1" that indicates the main power-source ON state in accordance with the above-described normal sequence before receiving from terminal 2 the state information that follows the change, terminal 2 again transmits to control apparatus 1 state information that includes the value "0" that indicates the main power-source OFF state after passage of the predetermined interval. Terminal 2 and control apparatus 1 subsequently return to the normal sequence, terminal 2 and control apparatus 1 transmitting and receiving state information that includes the value "0" that indicates the main power-source OFF state.

Figure 14:
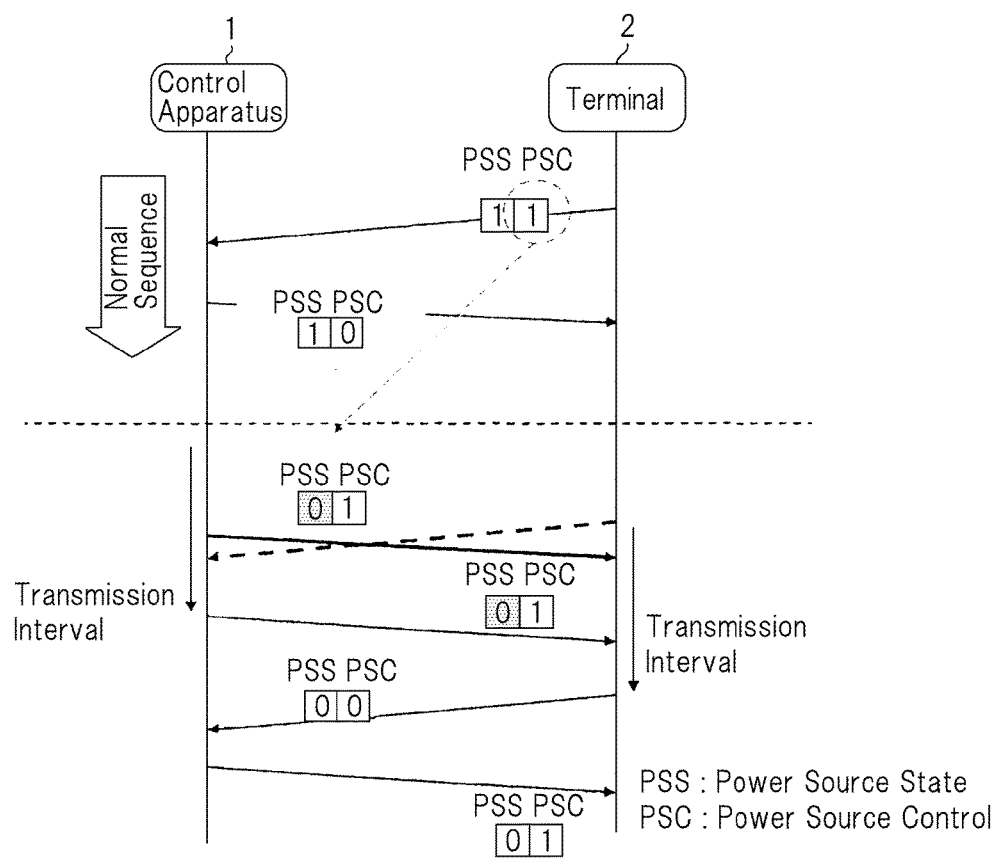
FIG. 14 is a sequence diagram showing a specific example of the operation when a terminal and a control apparatus transmit and receive state information.

FIG. 14 is a sequence diagram showing a specific example of the operation when a terminal and a control apparatus transmit and receive state information. FIG. 14 shows an example of operation in which control apparatus 1 requests terminal 2 to transition to the main power-source OFF state.

As shown in FIG. 14, during the normal sequence, terminal 2 transmits to control apparatus 1 at predetermined transmission intervals state information that includes the value "1" that indicates the main power-source ON state and a value "1" that indicates power-source control permission, and control apparatus 1 returns to terminal 2 state information that includes the value "1" that indicates the main power-source ON state and a value "0" that indicates that power-source control is not requested.

When control apparatus 1 requests terminal 2 to transition to the main power-source OFF state from the above-described normal sequence, control apparatus 1 transmits to terminal 2 state information that includes value "0" that indicates the main power-source OFF state and a value "1" that requests the power-source control. Upon receiving the power-source control request from control apparatus 1, terminal 2 transitions to the main power-source OFF state and transmits to control apparatus 1 state information that includes the value "0" that indicates the main power-source OFF state and the value "0" that indicates power-source control permission. When terminal 2 here transmits to control apparatus 1 state information that includes the value "1" that indicates the main power-source ON state in accordance with the above-described normal sequence before receiving the control command from control apparatus 1, control apparatus 1, after the passage of a predetermined interval, again transmits to terminal 2 state information that includes the value "0" that indicates the main power-source OFF state and a value "1" that requests power-source control. Terminal 2 and control apparatus 1 subsequently return to the normal sequence, terminal 2 transmitting to control apparatus 1 state information that includes the value "0" that indicates the main power-source OFF state and the value "0" that indicates power-source control refusal, and control apparatus 1 transmitting to terminal 2 state information that includes the value "0" that indicates the main power-source OFF state and the value "1" that requests power-source control.

Figure 15:
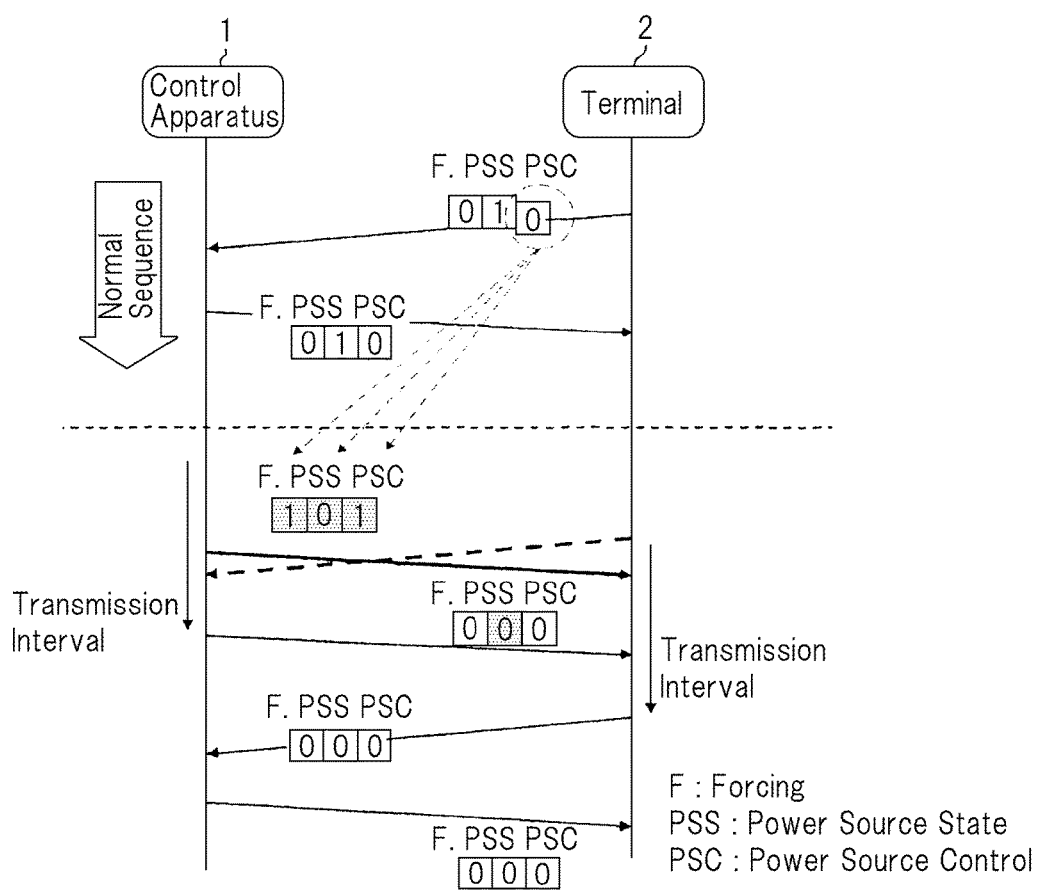
FIG. 15 is a sequence diagram showing a specific example of the operation when a terminal and a control apparatus transmit and receive state information.

FIG. 15 is a sequence diagram that shows a specific example of the operation when a terminal and a control apparatus transmit and receive state information. FIG. 15 shows an example of operation in which control apparatus 1 forcibly causes terminal 2 that is refusing to allow power-source control to transition to the main power-source OFF state.

As shown in FIG. 15, during the normal sequence, terminal 2 transmits to control apparatus 1 at predetermined transmission intervals state information that includes the value "1" that indicates the main power-source ON state, the value "0" that indicates power-source control refusal, and the value "0" that indicates normal time in which forcible change is not requested, and control apparatus 1 returns to terminal 2 state information that includes the value "1" that indicates the main power-source ON state, a value "0" that indicates that power-source control is not requested, and the value "0" that indicates normal time in which forcible change is not requested.

When control apparatus 1 requests terminal 2 to transition to the main power-source OFF state from the above-described normal sequence, terminal 2 is reporting "refusal" of power-source control, and control apparatus 1 therefore transmits to terminal 2 state information that includes, for example, the value "0" that indicates the main power-source OFF state, the value "1" that requests power-source control, and the value "1" that requests forcible change. Upon receiving the power-source control request that includes forcible change from control apparatus 1, terminal 2 transitions to the main power-source OFF state and transmits to control apparatus 1 state information that includes the value "0" that indicates the main power-source OFF state, the value "0" that indicates power-source control permission, and the value "0" that indicates normal time in which forcible change is not requested. When terminal 2 here transmits to control apparatus 1 state information that includes the value "1" that indicates the main power-source ON state in accordance with the above-described normal sequence before receiving the control command from control apparatus 1, control apparatus 1, after the passage of a predetermined interval, again transmits to terminal 2 state information that includes the value "0" that indicates the main power-source OFF state, the value "1" that requests power-source control, and the value "1" that requests forcible change. Terminal 2 and control apparatus 1 subsequently return to the normal sequence, terminal 2 transmitting to control apparatus 1 state information that includes the value "0" that indicates the main power-source OFF state, the value "0" that indicates power-source control refusal, and the value "0" that indicates normal time in which forcible change is not requested, and control apparatus 1 transmitting to terminal 2 state information that includes the value "0" that indicates the main power-source OFF state, the value "0" that indicates that power-source control is not requested, and the value "0" that indicates normal time in which forcible change is not requested.

Figure 16:
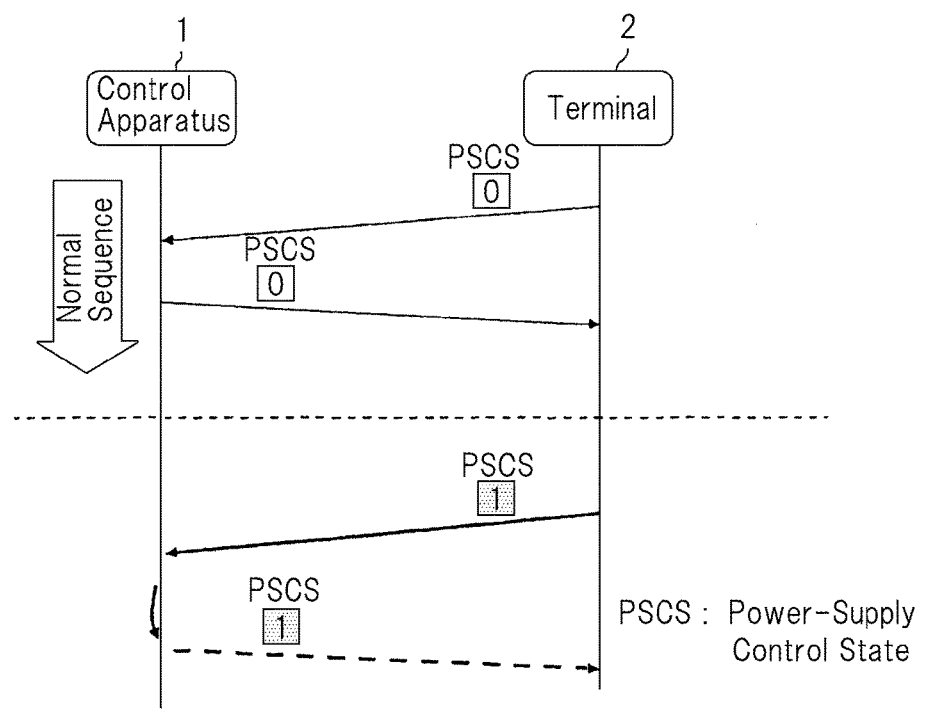
FIG. 16 is a sequence diagram showing a specific example of the operation when a terminal and a control apparatus transmit and receive state information.

FIG. 16 is a sequence diagram that shows a specific example of operation when a terminal and a control apparatus transmit and receive state information. FIG. 16 shows an example of operation in which power-supply control OFF is requested from terminal 2 to control apparatus 1.

As shown in FIG. 16, during the normal sequence, terminal 2 transmits to control apparatus 1 at predetermined transmission intervals state information that includes a value "0" that indicates the power-supply control state, and control apparatus 1 returns to terminal 2 state information that includes the value "0" that indicates the power-supply control state.

When terminal 2 requests power-supply control OFF from the above-described normal sequence, terminal 2 transmits to control apparatus 1 state information that includes a value "1" that indicates power-supply control OFF. At this time, control apparatus 1 is not requesting a state change of terminal 2 and therefore returns to terminal 2 the state information that was received from terminal 2 (ACK) that includes state information that includes the value "1" that indicates power-supply control OFF state. Terminal 2 and control apparatus 1 subsequently return to the normal sequence, terminal 2 and control apparatus 1 transmitting and receiving state information that include the value "1" that indicates the power-supply control OFF state.

Figure 17:
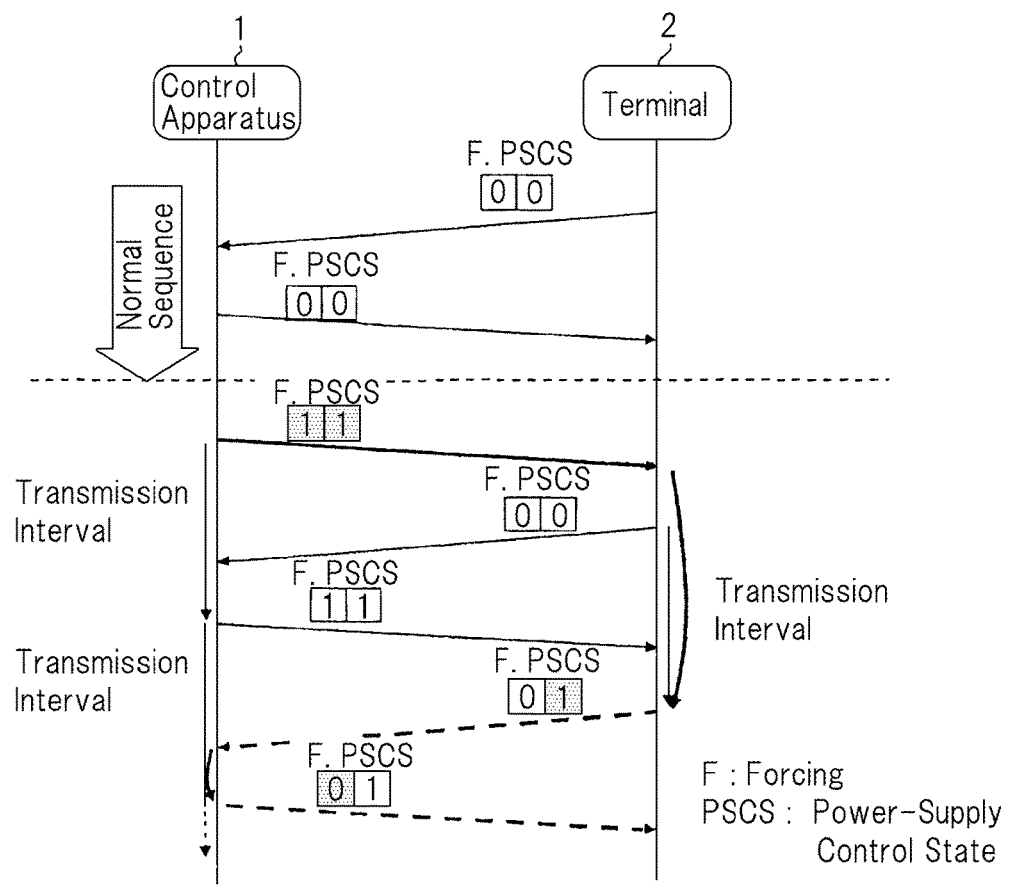
FIG. 17 is a sequence diagram showing a specific example of the operation when a terminal and a control apparatus transmit and receive state information.

FIG. 17 is a sequence diagram that shows a specific example of the operation when a terminal and a control apparatus transmit and receive state information. FIG. 17 shows an example of operation in which "power-supply control OFF" is communicated from control apparatus 1 to terminal 2.

As shown in FIG. 17, during the normal sequence, terminal 2 transmits to control apparatus 1 at predetermined transmission intervals state information that includes the value "0" that indicates the power-supply control state and the value "0" that indicates normal time in which a forcible change is not requested, and control apparatus 1 returns to terminal 2 state information that includes the value "0" that indicates the power-supply control state and the value "0" that indicates normal time in which forcible change is not requested.

When control apparatus 1 turns OFF power-supply control to terminal 2 from the above-described normal sequence, control apparatus 1 transmits to terminal 2 state information that includes a value "1" that indicates the power-supply control OFF state and a value "1" that requests a forcible change. Upon receiving the forcible change request to power-supply control OFF from control apparatus 1, terminal 2 transmits to control apparatus 1 state information that includes a value "1" that indicates the power-supply control OFF state and the value "0" that indicates normal time in which forced change is not requested. When terminal 2 here has transmitted to control apparatus 1 state information that includes the value "0" that indicates the power-supply control state in accordance with the above-described normal sequence, control apparatus 1 again, after the passage of a predetermined interval, transmits to terminal 2 state information that includes the value "1" that indicates the power-supply control OFF state and the value "1" that requests forcible change. Subsequently returning to the normal sequence, terminal 2 and control apparatus 1 transmit and receive state information that includes the value "1" that indicates the power-supply control OFF state and the value "0" that indicates normal time in which forcible change is not requested.

According to the present invention, control apparatus 1 and terminal 2 transmit and receive state information of identical data structure, i.e., state information by frames in which the arrangement of each state parameter is the same, and the processes for generating and changing the state information and the processes for analyzing each state parameter of the received state information can therefore be easily realized. As a result, information communication between control apparatus 1 and terminal 2 can be easily realized at low cost.

In addition, when changing its own state, terminal 2 uses state information to report the state after the change to control apparatus 1, and when state information is used to transmit a control command from control apparatus 1, terminal 2 changes the state of its own apparatus in accordance with the control command, whereby the state of terminal 2 can be easily controlled remotely by control apparatus 1.

Still further, each terminal 2 is identified using a MAC address, whereby the time and trouble to assign a characteristic ID to each terminal 2 is eliminated and each terminal 2 can be uniquely specified without assigning, for example, a network address to each terminal 2. As a result, even an apparatus that is not a network apparatus can be easily incorporated in a network that adopts the present invention if the apparatus is provided with communication means 21 for reporting state information to a control apparatus and state change means 22 for changing the state of its own apparatus in accordance with state information.

In addition, because terminal 2 is able to use predetermined control bits to communicate "control refusal" or "control permission" for power-source control of terminal 2 by control apparatus 1, power-supply control of terminal 2 by control apparatus 1, and sleep control of terminal 2 by control apparatus 1, notifying "control refusal" to control apparatus 1 eliminates the concern for unwanted control when power-source control, power-supply control, or sleep control poses problems for terminal 2, such as when a secondary battery provided in terminal 2 is in the process of charging and there is concern that the power supply will be halted during charging. On the other hand, because control apparatus 1 is able to use a forcing trigger to forcibly change the state of terminal 2 regardless of the communication of "control refusal" or "control permission" of terminal 2, control apparatus 1 is able to forcibly turn OFF the main power-source in the event of, for example, the occurrence of an abnormality in terminal 2. Still further, control apparatus 1 is able to use a timer to change the priority or state of terminal 2 at a predetermined time or after the passage of a time interval.

Accordingly, control content can be changed according to the current state of terminal 2 and a state change of terminal 2 can be changed at a predetermined time or after the passage of a time interval, whereby a power-supply system is obtained that enables appropriate control according to the state of terminal 2.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2010-187141 for which application was submitted on Aug. 24, 2010 and incorporates by citation all of the disclosures of this application.

The invention claimed is:

1. A state control system comprising:
   a controlled apparatus that transmits first state information comprising identification information for identifying the controlled apparatus, state parameters that correspond to states of the controlled apparatus, and a value which indicates that the controlled apparatus has refused to be controlled to cancel a sleep state; and
   a control apparatus that receives the first state information from the controlled apparatus, and the control apparatus transmits second state information, which includes at least parameters for changing a state of the controlled apparatus, to the controlled apparatus,
   wherein when the second state information received from the control apparatus includes a value indicating that a request is not to be made to the controlled apparatus to forcibly change its state, the controlled apparatus refuses a transition to the state which indicates the parameter that is included in the second state information, and
   wherein when the second state information received from the control apparatus includes a value indicating that a request is to be made to the controlled apparatus to forcibly change its state, the controlled apparatus transitions to the state according to the parameter that is included in the second state information.

2. The state control system according to claim 1, wherein the parameters of the second state information transmitted from the control apparatus comprise the state to which the controlled apparatus is to be changed.

3. The state control system according to claim 1, wherein the second state information transmitted from the control apparatus comprises a value of a timer indicating a setting time for changing the state of the controlled apparatus or a priority of operation of the controlled apparatus.

4. The state control system according to claim 1, wherein the identification information for identifying the controlled apparatus is a media access control (MAC) address.

5. The state control system according to claim 1, wherein the control apparatus comprises a power control device that supplies electrical power to the controlled apparatus.

6. A state control method comprising steps of:
a controlled apparatus transmitting first state information comprising identification information for identifying the controlled apparatus, state parameters that correspond to states of the controlled apparatus, and a value which indicates that the controlled apparatus has refused to be controlled to cancel a sleep state;
a control apparatus receiving the first state information from the controlled apparatus, and the control apparatus transmitting second state information, comprising at least parameters for changing a state of the controlled apparatus, to the controlled apparatus;
wherein when the second state information received from the control apparatus includes a value indicating that a request is not to be made to the controlled apparatus to forcibly change its state, the controlled apparatus refuses a transition to the state which indicates the parameter that is included in the second state information, and
wherein when the second state information received from the control apparatus includes a value indicating that a request is to be made to the controlled apparatus to forcibly change its state, the controlled apparatus transitions to the state according to the parameter that is included in the second state information.

7. The state control method according to claim 6, wherein the parameters of the second state information transmitted from the control apparatus comprises the state to which the controlled apparatus is to be changed.

8. The state control method according to claim 6, wherein the second state information transmitted from the control apparatus comprises a value of timer indicating a setting time for changing the state of the controlled apparatus or a priority of operation of the controlled apparatus.

* * * * *